United States Patent Office 3,600,418
Patented Aug. 17, 1971

3,600,418
ORGANO-SILICONE BLOCK COPOLYMERS
Donald L. Bailey, Sistersville, W. Va., and Francis M. O'Connor, Akron, Ohio, assignors to Union Carbide Corporation, New York, N.Y.
No Drawing. Continuation-in-part of application Ser. No. 162,980, Dec. 21, 1961, now Patent No. 3,480,583, which is a continuation-in-part of applications Ser. No. 660,997, and Ser. No. 661,009, both May 23, 1957. Said application Ser. No. 660,997 being a continuation-in-part of application Ser. No. 417,935, Mar. 22, 1954, now Patent No. 2,834,748, and said application Ser. No. 661,009 being in turn a continuation-in-part of application Ser. No. 435,938, July 10, 1954, now Patent No. 2,917,480. This application Aug. 5, 1969, Ser. No. 847,716
Int. Cl. C07f 7/04, 7/18
U.S. Cl. 260—448.8R
24 Claims

ABSTRACT OF THE DISCLOSURE

This invention relates to block copolymer compositions comprising at least one siloxane block and at least one oxyalkylene block, (I) the siloxane block (a) being a siloxane polymer composed of difunctional silicon atoms or both difunctional silicon atoms and at least one trifunctional silicon atom (each difunctional silicon atom being linked to two monovalent hydrocarbon groups and two oxygen atoms and each trifunctional silicon atom being linked to a hydrocarbon group and three oxygen atoms) that are joined through silicon-oxygen-silicon bonds and (b) being linked at one end to the oxyalkylene block by a carbon-oxygen-silicon bond and at the other end to a member selected from the group consisting of (1) another of said oxyalkylene blocks by a carbon-oxygen-silicon bond, (2) a trihydrocarbonsiloxy group and (3) an alkoxy group; and (II) the oxyalkylene block (a) being an oxyalkylene polymer having at least five oxyalkylene units joined together by carbon-oxygen-carbon bonds and (b) being bonded at one end to said siloxane polymer through a carbon-oxygen-silicon bond and at the other end to either (1) another of said siloxane blocks by a carbon-oxygen silicon bond or (2) a hydroxyl group, provided at least one oxyalkylene block is bonded at one end to a hydroxyl group.

The block copolymers of this invention are useful as lubricants for metals, fibrous glass, rubber molds and textiles, hydraulic fluids, emulsifying agents, surface tension depressants and foam stabilizers for polyurethane foam.

PARENT APPLICATIONS

This application is a continuation-in-part of application Ser. No. 162,980 now U.S. Pat. 3,480,583 which in turn was continuation-in-part of application Ser. No. 660,997 filed May 23, 1957 now abandoned, and application Ser. No. 661,009, filed May 23, 1957, now abandoned. Said application Ser. No. 660,997 was a continuation-in-part of application Ser. No. 417,935, filed Mar. 22, 1954, now U.S. Pat. 2,834,748; and said application Ser. No. 661,009 was a continuation-in-part of application Ser. No. 435,938, filed July 10, 1954, now U.S. Pat. 2,917,480.

This invention relates to organo-silicone compounds and to processes for making them. More particularly, it is concerned with organo-silicone compounds to which the name "block copolymer" is applied. In these block copolymers there are one or more blocks or sections to the molecule thereof which are silicone polymers (e.g. polydimethylsiloxy moieties) and one or more blocks or sections to the molecule thereof which are oxyalkylene polymers (e.g. polyoxyethylene moieties). The block copolymers of this invention are of two varieties, i.e. linear block copolymers and branched block copolymers. Both varieties are characterized by the presence of an oxyalkylene block endblocked by a hydroxyl group.

The linear block copolymers of this invention are linear polymers that are free of trifunctional silicon atoms (i.e., silicon atoms linked to three oxygen atoms and one carbon atom of a hydrocarbon group). In these linear block copolymers each siloxane block is linked at one end to an oxyalkylene block and at the other end to (1) another oxyalkylene block, (2) a trihydrocarbonsiloxy group, or (3) an alkoxy group while each oxyalkylene block is linked at one end to a siloxane block and at the other end to (1) another siloxane block or (2) a hydroxyl group, provided at least one oxyalkylene block is linked at one end to a hydroxyl group.

The branched block copolymers of this invention contain difunctional silicon atoms (i.e., silicon atoms linked to the two oxygen atoms and two carbon atoms of hydrocarbon groups), and at least one trifunctional silicon atom.

In the branched copolymers, each oxyalkylene block is linked at one end to a siloxane block and at the other end to (1) another siloxane block or (2) a hydroxyl group provided at least one oxyalkylene block is linked at one end to a hydroxyl group. The branched block copolymers of this invention have siloxane blocks wherein each terminal silicon atom is linked to (1) a trihydrocarbonsiloxy group (2) an alkoxy group or (3) an oxyalkylene block. Such terminal silicon atoms are, of course, also linked to one carbon atom of a hydrocarbon group (in the case of terminal trifunctional silicon atoms) or to two carbons of hydrocarbon groups (in the case of terminal difunctional silicon atoms).

The linear block copolymers of this invention are linear in nature and, considering only molecular content without regard to particular molecular structure, such copolymers can be represented by the general formula:

(A)   R'O—[(R$_2$SiO)$_x$]$_a$—[(C$_n$H$_{2n}$O)$_y$]$_b$—R' in which R' is hydrogen when attached to an oxyalkylene polymer and a trihydrocarbonsilyl group or an alkyl group when attached to a siloxane polymer; R is a monovalent hydrocarbon group and which can be the same or different for all R's in the molecule; x is an integer of 2 or more; y is an integer of 5 or more; n is an integer from 2 to 4; and a and b are integers each of which is equal to at least one, provided at least one R' is attached to an oxyalkylene polymer to form a hydroxyl endblocking group. By the term "monovalent hydrocarbon group" as used herein, is meant a monovalent group composed of carbon and hydrogen, such as, for example, a group of the aliphatic series including methyl, ethyl, vinyl, allyl, propyl, isopropyl, the butyls, the pentyls and the like; or of the aromatic series of which phenyl, methylphenyl, benzyl and other aralkyl groups are representative or of the cycloaliphatic series of which cyclopentyl, cyclopentenyl, cyclohexyl, cyclohexenyl and the like are representative.

The silicone block in the linear copolymers of this invention is a siloxane linear polymer or chain of recurring siloxane units, (—R$_2$SiO—), and is illustrated by the formula, —(R$_2$SiO)$_x$—, wherein R is a monovalent hydrocarbon group as previously defined and x is an integer equal to at least two. A silicon block of two units in which all of the monovalent hydrocarbon groups are methyl, —(Me$_2$SiO—Me$_2$SiO)—, would have a molecular weight of 148 which is the minimum molecular weight attributable to a silicone block in the compounds of this invention. Silicon blocks having individual molecular weights of as high as 50,000 or higher can be embodied in these novel organosilicone compounds. Compounds having silicon blocks of molecular weights ranging from 500 to 75,000 to the block are preferred. The monovalent hydrocarbon radicals need not be identical throughout the silicone block but may differ from siloxane unit to siloxane unit or may be different within a single siloxane unit.

The organic blocks of these linear block copolymers linear, predominantly oxyalkylene polymers comprised of recurring oxyalkylene units (—$C_nH_{2n}O$—) joined to each other by carbon-oxygen bonds. They can be individually represented by the general formula:

$$-[C_nH_{2n}O]_y-$$

in which, $n$ is an integer from 2 to 4; and $y$ is an integer of 5 or more. Thus, a polyoxyalkylene block of 5 oxyalkylene units in which $n$ equals 2 throughout each unit has a molecular weight of 220, which is the minimum molecular weight attributable to the organic block of the copolymeric molecule. Organic blocks having molecular weights of up to about 10,000 or higher can be used with molecular weights ranging from 500 to 600 to the block being preferred. The oxyalkylene units, comprising an organic block, are not necessarily identical throughout the block but can be different within each block. An organic block, for example, can be comprised of combinations of oxyethylene units, —$C_2H_4O$—; oxy-1,2-propylene units —$C_3H_6O$—; oxyl-1,3-propylene units, —$C_3H_6O$—; oxyethylene and oxypropylene units, —$C_2H_4O$—;

$$-C_3H_6O-$$

or the oxybutylenes, —$C_4H_8O$— or mixtures thereof. The oxyalkylene block or blocks of our copolymers are bonded at least at one end to a siloxane block or polymer through carbon-oxy-silicon bonds,

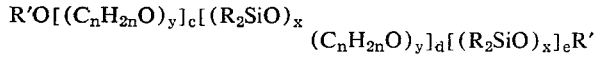

The linear block copolymers of this invention are terminated by monovalent groups from the group of trihydrocarbonsiloxy, hydroxy and alkoxy groups. These terminal groups are hydroxy or trihydrocarbonoxy groups when attached to oxyalkylene blocks and alkoxy or trihydrocarbonsiloxy groups when attached to siloxane blocks.

Thus, the general formula of the linear block copolymers of this invention can be more particularly set forth as follows:

(B)

$$R'O[(C_nH_{2n}O)_y]_c[(R_2SiO)_x(C_nH_{2n}O)_y]_d[(R_2SiO)_x]_eR'$$

in which R and R' are monovalent groups as previously defined; $n$, $x$, and $y$ are integers with identical meanings as set forth for Formula A; $c$ and $e$ are integers having a value of zero or one; and $d$ is an integer of a value of one or of a greater value. The symbol R' as used in this formula represents a monovalent chain-terminating group which is hydrogen when terminating an oxyalkylene block end of the copolymeric chain. When terminating a silicone block end of the copolymeric chain, R' is an alkyl group or a trihydrocarbonsilyl group.

This formula is generic to several different types of linear block copolymers all within the scope of the invention. It is to be understood that the compositions of this invention are complex mixtures of constituents generally depicted in Formula B, rather than made of identical organo-silicone block copolymers.

In the first type of linear block copolymers, with reference to Formula B, the integers $c$ and $e$ are both equal to 0 and the integer $d$ is a value of one or more, the general formula of this type being:

(I) $\quad R''O[(R_2SiO)_x(C_nH_{2n}O)_y]_dH$ wherein R'' designates an alkyl group or a trihydrocarbonsilyl group; R represents a monovalent hydrocarbon group; and $x$, $y$, $n$ and $d$ represent integers as defined in Formula B. The simplest compound of this type, of course, is one in which $d$ is equal to one, $x$ is equal to 2, $y$ has a value of 5, $n$ has a value of 2, R is a methyl group, R' of the silicon block end of the copolymeric chain represents a methyl group and R' of the oxyalkylene block end of the copolymeric chain represents hydrogen. This compound would have a molecular weight of 400 which is the minimum molecular weight for constituents of the compositions of this invention.

Referring to Formula B, a second type of linear block copolymer is one in which $c$ equals one, $e$ equals zero and $d$ has a value of one or more, the general formula of this type being:

(II) $\quad HO(C_nH_{2n}O)_y[(R_2SiO)_x(C_nH_{2n}O)_y]_dH$ wherein, R designates a monovalent hydrocarbon group; and $x$, $y$, $n$ and $d$ are integers having the same definitions as for those of like designations in Formula B. The simplest compound of this second type is one having the formula of (II), above in which $d$ is equal to 1, $y$ has a value of 5, $n$ is equal to 2, $x$ has a value of 2, and R is a methyl group. This compound would have a molecular weight of about 606.

According to one method of making our linear block copolymers, the linear copolymers of this invention can be produced by reacting a linear dialkoxy-endblocked polydihydrocarbon siloxane with a linear polyoxyalkylene diol or dihydroxypolyoxyalkylene with the hydroxyl groups of the diol condensing with the alkoxy groups of the polysiloxane in such a manner that polysiloxane blocks are linked to polyoxyalkylene blocks through carbon-oxy-silicon bonds,

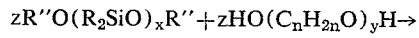

An alkanol is a co-product of the reaction. The molar ratio of diol to polysiloxane in the reaction mixture can be regulated, as desired, to control which of the two types of organo-silicone copolymers will be predominantly produced.

By using equimolar quantities of a linear dialkoxy endblocked polydihydrocarbonsiloxane and a linear polyoxyalkylene diol in the reaction mixture, it is possible to produce the first type copolymer as represented by Formula I and the reaction is illustrated by the following equation:

(Ia)

$$zR''O(R_2SiO)_xR'' + zHO(C_nH_{2n}O)_yH \rightarrow$$
$$R''O[(R_2SiO)_x(C_nH_{2n}O)_y]_zH + (2z-1)R''OH$$

in which, R'' represents an alkyl group; R designates a hydrocarbyl group $x$, $y$ and $n$ represent integers as previously defined with regard to Formula B; and $z$ is a positive integer.

By using in the reaction mixture, the linear dialkoxy-endblocked polydihydrocarbonsiloxane and the linear polyoxyalkylene diol in a ratio of more than one mole of the diol per mole of the silicone, the resulting product is a copolymer of the second type, as represented by Formula II. The reaction that takes place can be represented by the following equation:

(IIa)

$$z'R''O(R_2SiO)_xR'' + zHO(C_nH_{2n}O)_yH \rightarrow$$
$$HO(C_nH_{2n}O)_y[(R_2SiO)_x(C_nH_{2n}O)_y]_zH + 2z'R''OH$$

wherein, R'' designates an alkyl group; R represents a monovalent hydrocarbon group; $x$, $y$ and $n$ designate integers defined in the foregoing presentation of Formula B; and $z'$ is a positive integer and $z$ is a positive integer greater than $z'$.

Our linear block copolymers having siloxane blocks terminated at one end by trihydrocarbonsiloxy groups can be produced by employing trihydrocarbonsiloxy- and alkoxy-end-blocked polydihydrocarbonsiloxanes in lieu of all or a portion of the dialkoxy-endblocked dihydrocarbonsiloxanes depicted in Equations Ia and IIa. One such reaction is illustrated by the equation:

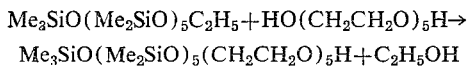

$$Me_3SiO(Me_2SiO)_5C_2H_5 + HO(CH_2CH_2O)_5H \rightarrow$$
$$Me_3SiO(Me_2SiO)_5(CH_2CH_2O)_5H + C_2H_5OH$$

According to another embodiment of our process for producing the linear block copolymers, a polyoxyalkylene diol can first be condensed with a dialkoxy-dihydrocarbonsilane and the resulting product then equilibrated with a cyclic dihydrocarbonsiloxane, e.g. dihydrocarbonsiloxane cyclic trimers or tetramers. The first reaction, i.e. the one that takes place by condensation can be represented by the equation:

(IV)   $zHO(C_nH_{2n}O)_yH + zR''OR_2SiOR'' \rightarrow$

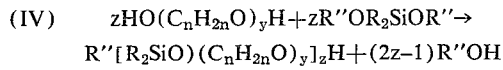

$$R''[R_2SiO)(C_nH_{2n}O)_y]_zH + (2z-1)R''OH$$

wherein R'' is an alkyl group; R is a monovalent hydrocarbon group; and $n$, $y$ and $z$ are positive integers. The product of this reaction which is a copolymer with a "siloxane block" of only one silicon atom is then equilibrated with a hydrocarbonsiloxane cyclic trimer or tetramer. The equilibration can be as represented by the equation which follows:

(V)

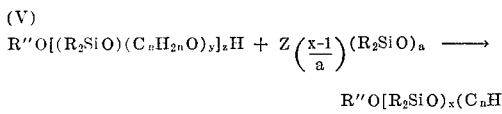

$$R''O[(R_2SiO)(C_nH_{2n}O)_y]_zH + Z\left(\frac{x-1}{a}\right)(R_2SiO)_a \longrightarrow$$
$$R''O[R_2SiO)_x(C_nH_{2n}O)_y]_zH$$

wherein R'' is an alkyl group; R is a monovalent hydrocarbon group; $x$ is an integer from 3 to 4; and $n$, $y$ and $z$ are positive integers. The equilibration (Equation V) can be carried out in accordance with the equilibration procedure as, for example, described in the copending application of D. L. Bailey, Ser. No. 398,225, filed Dec. 14, 1953, in which, dihydrocarbylsiloxane cyclic trimers, tetramers and higher polymers are equilibrated with polydihydrocarbonsiloxanes under substantially anhydrous conditions and in the presence of alkaline catalysts to produce linear polysiloxanes of greater chain length. It is to be further understood that the molar ratios of oxyalkylene glycol to polysiloxane in the initial reaction mixture of the first stage reaction (Equation IV) can be varied as in the reactions of Equations IIa to produce the other types of our compositions.

According to another embodiment of our process our linear block copolymers can be produced by the reaction of a polydihydrocarbonsiloxane containing terminal silanic hydrogen groups, i.e., hydrogen atoms bonded directly to silicon atoms with a polyoxyalkylene hydroxy compound in the presence of an alkaline catalyst, e.g., piperidine. The silanic hydrogen atoms are displaced by oxyalkylene chains which are thus bonded to the siloxane polymer through carbon oxygen-silicon bonds, thereby forming the organo-silicone copolymers of this invention, accompanied by the evolution of gaseous hydrogen as a co-product of the reaction.

The linear alkoxy end-blocked polysiloxane which is a reactant or starting material in the preferred process for making our linear block copolymers can itself be made by reacting a lower molecular weight polysiloxane with a dialkoxy silane. More specifically, a trimeric cyclic siloxane, $(R_2SiO)_3$, or a tetrameric cyclic soloxane, $(R_2SiO)_4$, for instance, can be equilibrated with a dihydrocarbyl dialkoxy silane in the presence of an alkaline catalyst to produce the linear polysiloxane having alkoxy end groups. The molecular weight of the resultant linear polysiloxane is dependent upon the charging ratios employed. The higher the proportion of cyclic trimer or tetramer to the polysiloxane. In the higher molecular weight ranges, the linear polysiloxane is obtained as a complex mixture of constituents, to which can be assigned a number average molecular weight which represents an average of the individual molecular weights of the polysiloxane constituents of the composition and of the proportion in which each is present in the composition. On the other hand, where the proportions of dialkoxy silane to the cyclic trimer or tetramer is high, depolymerization of the latter can result to produce a linear alkoxy, end-blocked polysiloxane starting material of as low as two siloxane units to the molecule, corresponding to the minimum size silicone block. As improved process for making linear alkoxy end-blocked polysiloxanes which are especially suitable for use as starting materials in making our block copolymers is described and claimed in copending application Ser. No. 398,225, filed Dec. 14, 1953, now U.S. Pat. 2,909,549. Another method for the preparation of alkoxy-end-blocked siloxanes is by controlled hydrolysis of dialkoxysilanes as described in U.S. Pat. 2,415,389. For the preparation of alkoxy-endblocked siloxanes of high molecular weight the former method, i.e., the one disclosed in the copending application, is preferred.

The polyoxyalkylene diol which is also a starting material or reactant in the production of our linear block copolymers includes the polyoxyethylene diols, the polyoxypropylene diols, the polyoxybutylene diols, mixed oxyethyleneoxypropylene diols and the like. These polyoxyalkylene diols, many, if not all, of which are available commercially in a wide range and variety of molecular weights, can themselves be made by reacting the corresponding alkylene oxide, or oxides with a diol starter. In this connection it is to be noted that when glycerol is used as a starter, according to our experience, addition of the alkylene oxide takes place at the two primary alcohol groups of the glycerol and the polyoxyalkylene addition product exhibits many of the properties characteristic of a diol of corresponding molecular weight. Alkylene oxide-glycerol addition products can also be used in making our block copolymers. When more than one alkylene oxide is employed, they can be added to the diol starter sequentially, or they can be first admixed and the admixture added to the diol starter, or they can be added to the diol starter in any other manner. United States Pat. No. 1,921,378 describes a method of making addition products of ethylene oxide or of propylene oxide, and mixed oxyethylene-oxypropylene diols are described in Pat. No. 2,425,845. Polyoxybutylene diols can be made by the reaction of a butylene oxide in the presence of a catalyst for the condensation, for instance, borontrifluorideetherate. Mixtures of different polyoxyalkylene diols can also be used as starting materials in producing our block copolymers.

It is also well known that polyoxyalkylene diols can be made by reacting alkylene oxides with other compounds having labile hydrogen atoms. Examples of such compounds are alkyl and aryl dithiols, such as, ethylene dithiol, and alkyl and aryl diamines, such as, hexamethylene diamine and m-phenylene diamine. Such polyoxyalkylene diols made from these diverse starting materials also form block copolymers of the same general type with polysiloxane polymers since the starting fragment of such polyoxyalkylene diol forms an insignificant fraction of the block copolymer.

The condensation reactions depicted in Equations (Ia) and (IIa) for forming the linear block copolymers according to our preferred process are reversible reactions and require means for forcing these reactions to completion. Many such means are known in the art. One effective means for forcing the reactions towards completion is the removal of alcoholic co-products, designated as R'OH from the reaction mixture. It is also apparent that the ultimate quantity of the alcoholic product, R'OH removed from each reaction mixture provides an indication of the extent to which that particular condensation reaction between the dialkoxy-endblocked polydihydrocarbylsiloxane and the polyoxyalkylene diol reactants has reached completion. Additionally, the rate at which the alcoholic product is removed from the reaction mixture serves to indicate the rate at which the reaction is progressing. That is, if a large quantity of alcoholic product is removed within a short period of reaction time, it may be concluded that the reaction is proceeding at a rapid rate, whereas the reaction is proceeding at a slow rate if the amount of alcoholic product removed in a given time is small.

Complete compatibility of the reactants is preferred, although not essential for the reaction to proceed at a reasonable rate. Certain alkoxy-endblocked polysiloxanes are incompatible with polyoxyalkylene diols or their monoethers. In such cases the two substances can be brought into reactive contact by dissolving them in a common solvent, although other measures can be employed instead. Suitable solvents are, for example, toluene or xylene, in which both reacting substances are mutually soluble. In some instances, where large molecular weight polyoxyalkylene diols are employed as reactants, complete compatibility of the reactants may not be attainable. The reaction in such instances progresses, but at a slower rate. The boiling point of a mutual solvent can be used to effectively control the reaction temperature. In controlling reaction temperature, a reflux condenser can be useful in maintaining the reaction mixture substantially at the boiling point of the mutual solvent under atmospheric or other pressures.

The condensation reaction is carried out preferably at temperatures in the range from 80° C. to 200° C. Undesirable side reactions forming water as a co-product are encouraged at temperatures above this range. Contamination by materials formed by these side reactions can be tolerated in most uses of our organo-silicone block copolymers. However, it may be desirable to remove these materials when formed and it is preferable to prevent their formation by choice of reaction temperature. At temperatures below this range the condensation reaction proceeds at a slow rate or not at all.

The catalyst employed in the above-mentioned condensation reactions are, in general, the carboxylic acids, including trifluoroacetic acid, perfluorobutyric acid, perfluoroglutaric acid, monochloroacetic acid, acetic acid, etc., or alkaline substances, such as potassium silanolate, $KO(SiO_2O)_nK$, wherein $b$ is a positive integer and R is an alkyl radical such as ethyl or methyl. The carboxylic acid catalysts are active with most starting materials, and are effective in low concentrations, e.g., as low as 0.1 percent by weight of the starting materials. They produce colorless to light-colored block copolymers and do not cause any degradation of the polysiloxane molecules to result in copolymeric products which are low in silicon content, as is the tendency of strong acid catalysts and alkaline catalysts. Of the carboxylic acid catalysts, the polyhalogen substituted aliphatic carboxylic acids particularly, trifluoroacetic acid, perfluorobutyric acid, and perfluoroglutaric acid provide exceptionally high catalytic activities and, are preferred.

Alkaline catalysts, in particular potassium silanolate containing about 3.0 percent by weight of potassium exhibit very high catalytic activity. The use of alkaline catalysts tends also to favor degradation of the polysiloxane chain during the condensation reaction with the formation of a corresponding cyclic polysiloxane and organo-silicone products which are low in silicon content. The degradation reaction is of the reversible type and may be opposed by adding to the initial reaction mixture the cyclic polysiloxane which is formed by the degradation reaction. For example, in producing polydimethylsiloxanepolyoxyalkylene diol block copolymers with potassium silanolate as a catalyst, we have observed that the addition of appreciable amounts of the cyclic tetramer of dimethylsiloxane results in products which have the theoretical silicon contents for the particular block copolymers desired to be formed without any accompanying degradation of starting material.

Neutral and mildly basic aqueous solutions of the water-soluble types of linear polysiloxane-polyoxyalkylene block copolymers of this invention are stable against hydrolysis and remain clear and homogeneous for extremely long periods of time. Strong acids and bases added to, or initially present in and unremoved from, these solutions tend to attach the hydrolyzable carbon-oxy-silicon bonds present in the molecules of said compounds to bring about the hydrolysis of the polysiloxane-polyoxyalkylene block copolymers within a short time. Upon the addition of trifluoroacetic acid, for example, to an aqueous solution of water-soluble polysiloxane-polyoxyalkylene block copolymers these solutions have been observed to become turbid within several minutes and to separate into a polyoxyalkylene glycol aqueous layer and a silicone oil or polysiloxane layer. The removal or neutralization of the acid catalyst employed in the condensation reaction, therefore, is desirable to provide a hydrolytically stable polysiloxane-polyoxyalkylene block copolymer. Neutralization of the acid catalyst with stoichiometric amounts of a weak organic base, e.g., triethanolamine, monoethanolamine, monoisopropanolamine, dibutylamine, etc., or sodium bicarbonate, anhydrous ammonia, etc., is to be preferred over the removal of the catalyst, as by washing with water, and subsequent treatment with an adsorptive material such as silica gel or "Magnesol."

Some of our linear block copolymers are water-soluble, and block copolymers having that fraction of their molecular weight which is attributable to the oxyethylene groups approximately equal to or greater than those fractions which are attributable to either the polysiloxane units or to oxypropylene or oxybutylene units are water-soluble. The water-soluble block copolymers are useful as rubber lubricants, particularly for tire molds, where their water-solubility permits them to be readily applied from an aqueous solution or emulsion. The lubricant can then be readily removed from the molded article by washing with water. Such property of ready removal by water-washing also enhances their utility as textile lubricants.

The water-soluble linear block copolymers are also mixable with water-soluble polyoxyalkylene diols, monoethers, and diethers and are useful as lubricants and hydraulic fluids in combination with such diols, monoethers and diethers, or with ethylene glycol or propylene glycol. The water-soluble block copolymers form useful ingredients of lubricants having a water base, commonly termed "hydrolubes." The alkoxypolysiloxanes are themselves water-insoluble, and immiscible with the above-mentioned materials, and our block copolymers have greatly enhanced utility over them.

Linear block copolymers wherein oxyalkylene units of the polyoxyalkylene block contains three or more carbons to the unit with but few or no oxyethylene units present are not water-soluble. They are miscible, however, with the starting polyoxyalkylene diols, or the corresponding monoether or diethers, and are useful as lubricating compositions in combination therewith.

Our linear block copolymers having at least limited water-miscibility and, especially, those copolymers prepared from polyoxyethylene diols as the polyoxyalkylene diol reactant, exhibit excellent emulsifying properties in such systems as benzene-water, silane-water, silicone oil-water mixtures and the like. In block copolymers where the polysiloxane blocks and polyoxyalkylene blocks are of the same or similar lengths, the emulsifying properties of the copolymers are enhanced. Emulsions prepared from our water-soluble block copolymers can be readily broken by the addition of acidic materials. This latter characteristic of emulsions obtained through the use of the water-soluble block copolymers, additionally, lend these copolymers to uses as "fugitive" emulsifying agents.

Another property of water-soluble linear block copolymers is the high surface activity of their aqueous solutions. In one instance of a 0.05 percent by weight aqueous solution of a block copolymer, prepared from a polyoxyethylene glycol having an average molecular weight of 550 and an alkoxy-end-blocked polydimethylsiloxane having an average molecular weight of 1036, the surface tension measured 28.5 dynes/centimeters at 24° C., while the surface tension of an aqueous solution of a commercially available detergent under the same conditions measured 33.2 dynes/centimeter.

Our linear block copolymers differ from other organosilicone copolymers in that the molecular weights of the polydihydrocarbylsiloxane block and of the polyoxyalkylene block can be predetermined and controlled to thereby provide a wide range of compositions. The average molecular weight and molecular content of the copolymeric product is controlled (1) by the selection of starting materials having the desired molecular weights and (2) by adjusting the molar ratio in which these starting materials are present in the initial reaction mixture.

Polyoxyalkylene diols and dialkoxy polyhydrocarbonsiloxanes vary widely in molecular weights and thus a broad field for the selection of varied molecular weight starting materials is available. Hence, the linear block copolymers may comprise one or more short, medium or long polysiloxane blocks in combination with one or more short, medium or long oxyalkylene blocks.

In addition, the molar ratio of polyoxyalkylene diol to polysiloxane may be varied over wide ranges to produce linear copolymeric products having diverse average molecular weights and different properties. When this molar ratio is greater or less than 1, one or the other of the starting material tends to endblock the copolymeric chain being formed during its early stages of growth, and thereby restrict the length of said chain. For example, when the molar ratio of diol to polysiloxane is greater than 1 there is the tendency for the copolymeric chain to become endblocked, by the diol, thereby being limited in length. In thus endblocking the copolymeric chain by the diols, the average molecular weight of the resulting copolymeric product may be maintained at a lower level than that of a copolymeric product produced from a reaction mixture in which the molar ratio of glycol to polysiloxane is more nearly equal or equal to 1, in the latter case the tendency towards end-blocking by either one of the starting materials being remote. The copolymeric product obtained by using a molar ratio of diol to siloxane of about 1 is believed to be more nearly of the type shown in Formula I which the block copolymer produced by using the diol to siloxane molar ratio of greater than 1 can be regarded as more nearly of the type shown in Formula II. A molar ratio of diol to polysiloxane of less than 1 is not used as then the polysiloxane tends to end-block the copolymeric chain and the resulting block copolymer does not have the requisite hydroxyl-endblocked oxyalkylene block.

A few of the many possible combinations are shown in the table below:

TABLE I.—AVERAGE MOLECULAR WEIGHTS OF LINEAR BLOCK COPOLYMERS

| Average molecular weight of polysiloxane blocks | Molar ratio of oxyalkylene to polysiloxane blocks | Average molecular weight of oxyalkylene block | | |
|---|---|---|---|---|
| | | 500 | 1,000 | 5,000 |
| 500 | 1:2 | 1,500 | 2,000 | 6,000 |
| | 9:10 | 9,500 | 14,000 | 50,000 |
| | 10:9 | 9,500 | 14,500 | 54,500 |
| | 2:1 | 1,500 | 2,500 | 10,500 |
| 1,000 | 1:2 | 2,500 | 3,000 | 7,000 |
| | 9:10 | 14,500 | 19,000 | 55,000 |
| | 10:9 | 14,000 | 19,000 | 59,000 |
| | 2:1 | 2,000 | 3,000 | 11,000 |
| 5,000 | 1:2 | 10,500 | 11,000 | 15,000 |
| | 9:10 | 54,500 | 59,000 | 95,000 |
| | 10:9 | 50,000 | 55,000 | 95,000 |
| | 2:1 | 6,000 | 7,000 | 15,000 |

The linear block copolymers of this invention thus form useful compositions over a wide range of polysiloxane content from about 5 percent to about 95 percent by weight as shown by the above table.

As illustrations of the various types of linear block copolymers which are obtainable in accordance with the teachings of this invention, specific examples of block copolymers prepared from polysiloxanes and particular polyoxyalkylene diols are presented below. In these examples the average molecular weights of the polyoxyalkylene diols represented are those determined from acetyl values, except where indicated otherwise, and those of the dialkoxypolydihydrocarbonsiloxanes were determined from charging ratios used in the preparation of said siloxanes or from cryoscopic values of said siloxanes in cyclohexane.

In the examples, reduced specific viscosities were determined by measuring viscosities of solutions containing one gram of block copolymer sample in 100 milliliters of toluene and employing the formula below.

$$\text{Reduced specific viscosity} = \frac{\left(\frac{N_c}{N_o}\right) - 1}{C}$$

$N_c$ is the solution viscosity in centipoise at 20° C., $N_o$ is the solvent viscosity in centipoise at 20° C. and C is the concentration of sample in grams per 100 milliliters of solution.

Linear block copolymers from polyoxyethylene glycols and dialkoxy polydihydrocarbonsiloxanes The polyoxyethylene glycol molecule is particularly characterized by two hydroxyl groups which may be readily reacted. When mixed with alkoxy-endblocked polysiloxanes and heated in the presence of a suitable catalyst, as for example, a carboxylic acid or an alkaline substance, they condense with said polysiloxanes to form block copolymers constituted by molecules having one or more polyoxyethylene glycol chains connected to one or more polysiloxane chains.

Our linear block copolymers range from viscous liquids to high melting solids and from water-soluble to water-insoluble. For example, a block copolymer, produced from diethoxy polydimethylsiloxane having an average molecular weight of 1036 and polyoxyethylene glycol having an average molecular weight of 550, is water-soluble. A block copolymer obtained from the condensation of diethoxy polydimethylsiloxane having an average molecular weight of 16,000 and polyoxyethylene glycol having an average molecular weight of 6000 is water-insoluble. Block copolymers containing higher percentages of oxyethylene units have been observed to exhibit greater water solubility than block copolymers containing lower percentages of oxyethylene units. The following table illustrates water-solubilities corresponding to various percentages of oxyethylene in copolymers prepared from equimolar quantities of polyoxyethylene glycols and ethoxy-endblocked polydimethylsiloxanes.

TABLE II

| Average molecular weight of— | | Percent by weight of oxyethylene groups in copolymer | Water solubility of organo-silicone copolymer |
|---|---|---|---|
| Polydimethyl-siloxane | Polyoxy-ethylene glycol | | |
| 518 | 550 | 51.5 | S |
| 1,036 | 550 | 34.6 | S |
| 16,000 | 6,000 | 27.3 | I |

In general, polyoxyethylene-polydihydrocarbonsiloxane copolymers containing more than about 28 to 34 percent by weight of oxyethylene groups are water-soluble while those with a lower weight percent are water-insoluble.

Our water-soluble linear block copolymers are particularly useful in those systems listed previously. They are also useful in many other systems containing two or more immiscible components. We have found that those systems containing one, or more than one, component which is miscible with polyoxyethylene glycol and one other, or more than one other, component which is miscible with linear polysiloxanes are particularly suited for emulsification by our polyoxyethylene-polysiloxane block copolymers. By our invention it is now possible to prepare aqueous solutions containing polysiloxanes for use, as tire mold release agents and in textile lubricating agents where it is desired to provide a simple and inexpensive vehicle for these agents. The insoluble polyoxyethylene-polydihydrocarbonsiloxane copolymers are also useful as mold release agents and, additionally as lubricants and rubber plasticizers.

The oxyalkylene blocks in the branched copolymers of this invention are of the same type as the oxyalkylene blocks in the linear block copolymers of this invention. Such oxyalkylene blocks are fully described above.

The siloxane block in the branched block copolymers of this invention is composed of silicon, oxygen, carbon and hydrogen and comprises recurring difunctional silicon units ($R_2SiO$) and one or more recurring trifunctional silicon unit, $RSiO\equiv$, which can be graphically represented by the formula:

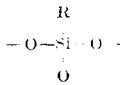

in which R is a monovalent hydrocarbon group as defined above or a polyvalent hydrocarbon group (e.g. $-CH_2CH_2-$, $-CH_2CH_2CH_2-$ and $-CH_2CH_2CH<$) and need not be the same throughout the siloxane block. The trifunctional silicon unit is inter-connected from 1 to 3 other silicon atoms of the siloxane polymer through oxysilicon bonds,

A general formula of many branched block copolymers of this invention is as follows:

$$(R')(SiO_3)_x(R_2SiO)_y[(C_nH_{2n}O)_zH]_a[R''']_{3x-a} \quad (i)$$

where $x$ is an integer and represents the number of trifunctional silicon atoms bonded to a single monovalent or polyvalent hydrocarbon radical, R'; R is a monovalent hydrocarbon group as defined above; $a$ is an integer having a value of at least 1 and represents the number of polyoxyalkylene chains in the block copolymer; $y$ is an integer having a value of at least 3 and denotes the number of difunctional siloxane units, $n$ is an integer from 2 to 4 denoting the number of carbon atoms in the oxyalkylene group; and $z$ is an integer having a value of at least 5 and denotes the length of the oxyalkylene chain. It will be understood further that such compositions of matter are mixtures of such block copolymers wherein $y$ and $z$ are of different values and that methods of determining the chain length of the polysiloxane chains and the polyoxyalkylene chains give values which represent average chain lengths. In the above Formula (i), R represents monovalent hydrocarbon radicals, such as alkyl, aryl or aralkyl radicals, the polyoxyalkylene chain terminates with a hydrogen atom, R''' is an alkyl radical or a trihydrocarbonsilyl radical having the formula $$R_3Si-$$

where R is a monovalent hydrocarbon radical and terminates a siloxane chain, and R' represents a monovalent or polyvalent hydrocarbon radical, being monovalent when $x$ is 1, divalent when $x$ is 2, trivalent when $x$ is 4.

One type of branched block copolymer is represented when $x$ in formula (i) is one, and in this instance a branchedchain formula may be postulated as follows:

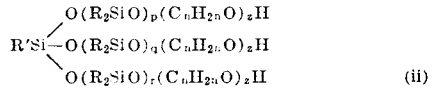

where $p+q+r=y$ of Formula (i) and has a minimum value of 3, the other subscripts being the same as in Formula (i). In this instance, all three of the oxyalkylene chains are joined to the end of polysiloxane chains of the type $-(R_2SiO)-$. However, another type of branched-chain block copolymer exists when one of the oxyalkylene chains is attached through an oxygen atom to the trifunctional silicon atom bonded only to a single monovalent hydrocarbon radical (R'). This formula may be given as follows:

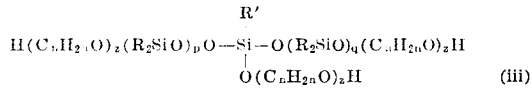

where $p+q=y$ of Formula (i) and has a minimum value of 3. Another type of branched block copolymer is represented when there are present therein two trifunctional silicon atoms each bonded to a single divalent hydrocarbon radical, and correspondingly present therein six polyoxyalkylene chains. Such block copolymers may be represented by the formula:

$$(O_3SiR'SiO_3)(R_2SiO)_y[(C_nH_{2n}O)_zH]_6 \quad (iv)$$

wheer R, $y$, $n$ and $z$ are as designated for Formula (i), and R' is a divalent hydrocarbon radical. Expressed in structural form these block copolymers may be represented by the following formula:

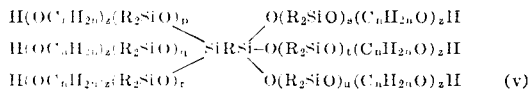

where $p+q+r+s+t+u$ is equal to $y$ of Formula (i) and in this instance has a minimum value of 6.

Our branched copolymers can be advantageously made by reacting an alkoxy trifunctional siloxane polymer with a hydroxy endblocked oxyalkylene polymer accompanied by the elimination of a molecule of an alkanol for each hydroxyl group of the hydroxy oxyalkylene polymer reacted and the attachment of one block of the oxyalkylene polymer to a block of siloxane polymer through a silicon-oxy-carbon bond for each molecule of alkanol removed. This reaction which is aptly called a condensation reaction can be illustrated by the following equation:

(A)

wherein R' is an alkyl group and R'' is a monovalent group from the class of monovalent hydrocarbon groups and hydrogen. In the case where R'' is hydrogen the reaction can continue in a manner illustrated by the following equation:

(B)

provided a hydroxyl endblocked oxyalkylene block is present in the final product.

The condensation reactions depicted in the above Equations A and B for forming the branched block copolymers are essentially reversible reactions and are advantageously forced to completion by the removal of alcoholic products, generally designated as R'OH, from the reaction mixtures. It is apparent, furthermore, that the ultimate quantity of the alcoholic product removed from each reaction mixture provides an indication of the extent to which that particular condensation reaction between the alkoxy polysiloxane and the hydroxyoxyalkylene polymer reactants has reached completion. The rate at which the alcoholic product is removed from the reaction mixture additionally serves to indicate the rate at which the reaction is progressing. That is, if a large quantity of alcoholic product is removed within a short period of reaction time, it may be concluded that the reaction is proceeding at a slow rate if the amount of alcoholic product removed in the given time is small.

Alkoxy-containing trifunctional polysiloxanes that are compatible with hydroxy oxyalkylene polymers readily react therewith. Thus, the reactions of Equations A and B can be carried out by heating simple mixtures of such silicone and glycol reactants and the catalyst at a temperature within the range of 80° C. to 250° C. However, the reactions appear to be more efficient when the reactants are dissolved in a suitable solvent, such as, for example, toluene or xylene, in which the reacting substances are mutually soluble and, thus, brought into intimate contact. The reaction temperature can be readily controlled by the reflux temperature of the polysiloxane-polyoxyalkylene mono-ol or diol solution and higher boiling solvents will permit higher reaction temperatures. Although the type of solvent is not critical to the success of the condensation reaction, it is preferably that the starting materials be mutually soluble therein. It is also advantageous to employ an amount of said solvent which is sufficient to provide a homogeneous solution of the starting materials at the reaction temperature. Such a reaction in a suitable solvent provides a more rapid condensation which more nearly approaches completion than in a similar reaction carried out in the absence of a mutual solvent.

Although the use of toluene and xylene as mutual solvents for the reaction mixture of this invention involving reactions A or B provides a high enough reaction temperature to carry out the condensation reaction to completion, under reflux at atmospheric pressure, toluene in certain instances, is to be preferred for practical reasons over xylene. It has been found that in some condensation reactions using reflux at atmospheric pressure for temperature control the higher reflux temperature provided by xylene as a solvent encourages undesirable side reactions producing water instead of the expected alcoholic product. This difficulty can be overcome by any suitable means, for example, by the use of reduced pressures, or by the use of a solvent, such as toluene, which provides a lower atmospheric reflux temperature, and thus, by lowering the reaction temperatures, eliminate or lessen the tendency towards side reactions. When toluene is used as a solvent the alcoholic product, resulting from the condensation reaction, is removed as an azeotrope with toluene.

The catalyst which can be employed in the condensation reactions are depicted by Equations A and B are, in general, the organic acids, including trifluoroacetic acid, perfluorobutyric acid, perfluoroglutaric acid, monochloroacetic acid, acetic acid, etc. or alkaline substances, such as potassium silanolate, $KO(SiR_2O)_bK$, wherein $b$ is a positive integer and R is an alkyl radical such as ethyl or methyl. The organic acid catalysts are active with most starting materials, and are effective at low concentrations, e.g., as low as 0.1 percent by weight of the starting materials. They produce colorless to light-colored block copolymers and do not cause any degradation of the polysiloxane molecules to result in copolymeric products which are low in silicon content as is the tendency of mineral acid catalysts and alkaline catalysts. Of the organic acid catalysts, trifluoroacetic acid, perfluorobutyric acid, and perfluoroglutaric acid provide exceptionally high catalytic activities, and therefore, are to be preferred.

The alkaline catalysts, in particular potassium silanolate containing about 3.0 percent by weight of potassium, exhibit very high catalytic activity. The use of alkaline catalysts, in some cases, tends to cause the degradation of the polysiloxane block during the condensation reaction to produce the corresponding cyclic polysiloxanes and organo-silicone products which are low in silicon content. The degradation reaction is of the reversible type and can be opposed by the addition to the initial reaction mixture of the cyclic polysiloxane expected to be produced by the degradation process brought about under the influence of the alkaline catalyst.

While neutral and mildly basic aqueous solutions of the water-soluble types of branched block copolymers of this invention are stable against hydrolysis and remain clear and homogeneous for extremely long periods of time, strong acids and bases added to or initially present in and unremoved from these solutions tend to attack the hydrolyzable Si—O—C— bonds present in the molecules of said compounds to bring about the hydrolysis of said polysiloxane-polyoxyalkylene block copolymers within a short time. The addition of hydrochloric acid, for example, to an aqueous solution of water-soluble polysiloxane-polyoxyalkylene block copolymers caused these solutions to become turbid within several minutes and separate into polyoxyalkylene glycol monoether aqueous layer and silicone oil or polysiloxane layer. The removal or neutralization of the acid catalyst employed in the condensation reaction, therefore, may be desirable to provide a hydrolytically stable polysiloxane-polyoxyalkylene block copolymer. The neutralization of catalysts with stoichiometric amounts of a weak organic base, e.g., triethanolamine, monoethanolamine, monoisopropanolamine, dibutylamine, etc., or sodium bicarbonate, anhydrous ammonia, etc., is to be preferred over the removal of the catalyst, as by washing with water, and subsequent treatment with absorption material such as silica gel or "Magnesol," inasmuch as the latter process results only in an incomplete removal of the residual acid catalyst.

According to another embodiment of our process for producing the branched block copolymers, the hydroxy oxyalkylene polymer can first be condensed with a trialkoxy monohydrocarbonsilane and the resulting product then equilibrated with a cyclic polydihydrocarbonsiloxane, e.g., the cyclic trimers or tetramers. The condensation reaction can be carried out as described above and the equilibration can be carried out in accordance with any suitable equilibration procedure, for example, as described in U.S. Pat. No. 2,453,092.

According to still another embodiment of our process, our crosslinked block copolymers can be produced by the reaction of a siloxane containing silanic hydrogen with a hydroxy end-blocked oxyalkylene polymer in the presence of an alkaline catalyst, e.g., piperidine. The silanic hydrogen atoms are displaced by oxyalkylene chains which are thus bonded to the siloxane polymer through carbon-oxy-silicon bonds, thereby forming the organo-silicone block copolymers of this invention, accompanied by the evolution of gaseous hydrogen as a co-product of the reaction.

The alkoxy trifunctional hydrocarbonsiloxane polymers which are reactants or starting materials for the production of the branched block copolymers of this invention are siloxane polymers which comprise one or more trifunctional silicon units to each of which is connected from one to two alkoxy groups. These silxoane polymers comprise recurring silicon units which can be represented by the formula:

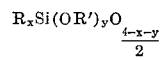

wherein, R is a monovalent hydrocarbon group, R' is an alkyl group, $x$ is an integer from one to three, $y$ is an integer from zero to two, and the sum of $x$ and $y$ is an integer from one to three, and $x$ and $y$ need not be the same throughout the polymer molecule. The polymer molecule contains silicon units in which 4 is equal to 2, at least one silicon unit in which $x$ is equal to 1 and at least one silicon unit where $y$ is equal to 1.

Alkoxy trifunctional hydrocarbonsiloxane polymers can be made by any of the many methods known in the art. Illustratively, such trifunctional siloxane polymers are made as described in the copending application of D. L. Bailey, Ser. No. 398,225, filed Dec. 14, 1953 now U.S. Pat. 2,090,549. A suitable siloxane has alkoxy groups attached to silicon atoms which are located intermediately in the polymer chains, as for example, in the average formula:

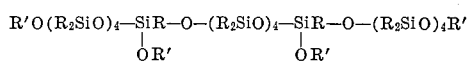

where, R designates a monovalent hydrocarbon group, and R' designates an alkyl group. By employing monofunctional siloxanes (e.g. Me₃SiOSiMe₃( along with the other reactants in such equilibration reactions, products having trihydrocarbonsiloxy end-blocking groups (e.g.

[Me₃SiO(Me₂SiO)₅]₂Si(Me)OC₂H₅)

can be obtained. The latter products can be reacted as described above with hydroxy oxyalkylene polymers to produce our block copolymers wherein the siloxane block has trihydrocarbonsiloxy end-blocking groups. The latter reaction is illustrated by the equation:

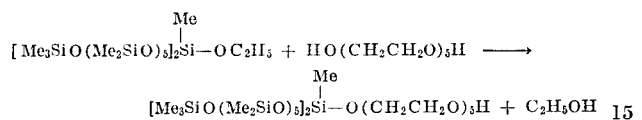

Hydroxy oxyalkylene polymers employed in the reaction to form our branched block copolymers must possess a minimum chain length to be effective for the purposes of this invention. Such chain length is herein defined as a minimum of five oxyalkylene units which is the chain length found necessary to exert a significant effect on such properties as solubility and lubricity of the block copolymers. The specific effect contributed by the polyoxyalkylene chain will vary with the type of oxyalkylene unit making up the chain. Thus, polysiloxane-polyoxyalkylene block copolymers in which the oxyalkylene units are composed of oxypropylene units are water-insoluble, whereas the molecules may be water-soluble when the oxyalkylene unit is oxyethylene, depending on the polysiloxane-polyoxyethylene ratio. The polyoxyalkylene block copolymers will vary in solubility from water-soluble to water-insoluble when the polyoxyalkylene chain is composed of both oxyethylene and oxypropylene units depending on their ratio and on the polysiloxanepolyoxyethylene ratio.

The polyoxyalkylene diols which can be employed as starting materials in the production of our branched block copolymers include the polyoxyethylene diols, the polyoxypropylene diols, the polyoxybutylene diols, mixed polyoxyethylene-oxypropylene diols and the like. These polyoxyalkylene diols, many, if not all, of which are available in a wide range and variety of molecular weights, can themselves be made by reacting the corresponding alkylene oxide or oxides, with a diol starter. In this connection it is to be noted that when glycerol is used as a starter, according to our experience, addition of the alkylene oxide takes place at the two primary alcohol groups of the glycerol and the polyoxyalkylene addition product exhibits many of the properties of a diol of corresponding molecular weight. Alkylene oxide-glycerol addition products can also be used in making our block copolymers. When more than one alkylene oxide is employed, they can be first admixed and the admixture added to the starter, or they can be added to the starter in any other manner. U. S. Pat. No. 1,921,378 describes a method of making addition products of ethylene oxide or of propylene oxide and mixed oxyethylene-oxypropylene diols are described in U.S. Pat. No. 2,425,845. Polyoxybutylene diols can be made by the reaction of a butylene oxide in the presence of a catalyst for the condensation, for instance, borontrifluoride-etherate. Mixtures of different polyoxyalkylene diols can also be used as starting materials in producing our block copolymers.

It should be noted that by using an excess of the dihydroxypolyoxyalkylene polymer we avoid excessive crosslinking between the starting materials and also provide for the ready completion of the reaction which leads to the production of copolymers which are predominantly of the type set forth in Formula (ii). Undoubtedly some crosslinking will occur during the reaction and the presence of some amounts of crosslinked copolymers (both partial and complete) will be present in the reaction product. Thus, for example, a small amount of partially crosslinked copolymers of the following type is probably present in the reaction product.

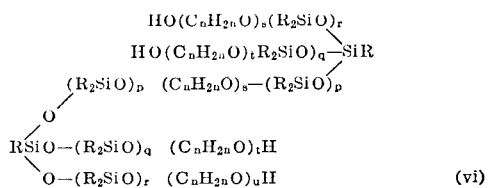

Crosslinked polymers of the above type are for the most part soluble in the reaction and will not materially affect the useful properties thereof. However, if some amounts of completely cross-linked materials are present they will be insoluble in the reaction product and can be removed therefrom by filtration or other suitable means.

Polyoxyalkylene mono-ols which can also be used as starting materials in the production of our branched block copolymers can be made in accordance with known methods by reacting the corresponding alkylene oxide or oxides with a mono-ol starter.

Monohydroxy polyoxypropylene monoethers, i.e., polyoxypropylene mono-ols, suitable for use in producing the branched block copolymers of the invention are described in Fife and Roberts U.S. Pat. No. 2,488,664. In addition, polyoxyalkylene monoethers containing both oxyethylene and oxypropylene groups in the molecule may be formed by the addition of ethylene oxide and propylene oxide to a monohydric alcohol to form oxyalkylene chains composed of oxyethylene groups and oxypropylene groups. Monohydroxy oxyethylene-oxy-1,2-propylene monoethers having both oxyethylene and oxypropylene groups in the molecule are described in Roberts and Fife U.S. Pat. No. 2,425,755.

Other hydroxy oxyalkylene polymers which can be used in preparing our branched copolymers and methods for their preparation are described in the A.C.S. Monograph No. 114, entitled "Glycols," G. O. Curme and F. Johnston, Editors, Reinhold Publishing Corp., 1952. It is also well known that hydroxy oxyalkylene polymers can be made by reacting alkylene oxides with other compounds having a labile hydrogen atom. Examples of such compounds are alkyl and aryl thiols, such as ethyl and butyl thiols, and alkyl and aryl amines and diamines, such as mono-butyl- and dibutylamine, hexamethylene diamine and aniline. Such hydroxy oxyalkylene polymers made from such diverse starting materials also form block copolymers of the same general type with polysiloxane polymers as the starting fragment of the hydroxy oxyalkylene polymer forms an insignificant fraction of the block copolymer.

A unique property of some branched block copolymers introduced by this invention is their water-insolubility, and block copolymers having that fraction of their molecular weight which is attributable to oxyethylene units approximately equal to or greater than those fractions which are attributable to the sum of polysiloxane units, and oxypropylene and/or oxybutylene units are water-soluble, and are at least partially water-soluble when the mole-fraction of oxyethylene units is at least one-fourth of the sum of mole-fractions of the oxybutylene and/or oxypropylene units and the siloxane units. Certain of the water-soluble copolymers are also soluble in some organic solvents such as benzene and are useful as emulsifying agents for water-silicone and water-organic solvent mixtures. Other of the water-soluble copolymers particularly those containing attached vinyl groups are useful as sizes for fibrous glass.

Our branched block copolymers wherein the polyoxyalkylene block contains few or no oxyethylene units are not water-soluble, but they can be mixed with the starting monohydroxy polyoxyalkylene monoethers or the corresponding diols, or diethers, and form useful compositions in combination therewith. A typical example is the mixture of mono-butyl ether of polyoxy-1,2-propylene glycol and the block copolymer produced from the reaction of this glycol and with an alkoxy trifunctional hydrocarbyl polysiloxane. Such a mixture exhibits markedly improved lubricating properties.

A truly remarkable property of certain of our branched block copolymers is their load-carrying capacity as metal-to-metal lubricants for moving surfaces. Silicone fluids, such as dimethyl silicone oils, are very poor lubricants for such service, having practically no load-carrying capacity. However, it has been found that the block copolymers, whose polysiloxane content corresponds to a silicon content of between 2 percent and 25 percent silicon by weight are excellent metal-to-metal lubricants and have better load-carrying capacity than the polyoxyalkylene fluids and dimethyl silicone oils.

The compositions of this invention include mixtures of block copolymers. By way of illustration, when the siloxane polymers (blocks) in the compositions are equilibrated, various copolymeric species in the compositions will differ from each other with respect to the number of silicon atoms in the siloxane polymers (blocks). In some species in compositions containing equilibrated siloxane polymers having both difunctional and trifunctional silicon atoms, all the silicon atoms in the siloxane polymers will be difunctional and in other species all silicon atoms will be trifunctional. Similarly, various copolymeric species in the compositions can differ from each other with respect to the number and, when more than one type of oxyalkylene unit is present in the compositions, the type of oxyalkylene units in the oxyalkylene polymers (blocks). Further, various copolymeric species in the compositions can differ from each other with respect to the relative number of siloxane and oxyalkylene blocks or polymers in each species. Small amounts of siloxane polymer species free of chemically combined oxyalkylene polymer and small amounts of oxyalkylene polymer species free of chemically combined siloxane polymer are also usually present in the compositions of this invention. Accordingly, some of the compositions of this invention can be properly described as mixtures having an average composition. On the other hand, the compositions of this invention can be discrete chemical compounds, particularly in the case where the compositions are produced from discrete low molecular weight reactants.

As indicated above, the block copolymers of this invention are characterized by the presence of hydroxyl endblocking groups on the oxyalkylene blocks. Such hydroxyl endblocking groups impart desirable properties to the block copolymers which can be used to advantage in the production of rigid polyether polyurethane foams. By way of illustration, the block copolymers of this invention form mixtures with the polyol reactants and fluorocarbon blowing agents used to produce rigid polyurethane foams that are more compatible than mixtures of polyols, fluorocarbons and otherwise identical block copolymers containing alkoxy endblockers rather than hydroxy endblockers. As a further illustration, the block copolymers of this invention not only function as foam stabilizers for rigid polyurethane foams but result in foams having a more closed cell structure than foams produced using otherwise identical copolymers having alkoxy endblockers. Such closed cell foams give improved performance as thermal insulation materials.

The following examples illustrate the present invention.

Examples 1 to 11 illustrate the preparations of branched block copolymers of this invention.

EXAMPLE 1

An oxyalkylene polymer having the average formula:

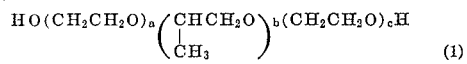
(1)

wherein $a$ and $c$ each have an average value of 9.2 and $b$ has an average value of 20.7 (139.7 grams, 0.070 mole) was dehydrated by forming a solution thereof with toluene (300 cc.) and then distilling a water-toluene azeotrope from the mixture. The dehydrated solution of oxyalkylene polymer was then cooled to 60° C. and was mixed with trifluoroacetic acid (0.5 grams) and with a siloxane polymer (35.3 grams, 0.0205 mole, 0.062 equivalents of $OC_2H_5$) having the average formula:

$$[C_2H_5O(Me_2SiO)_d]_3SiC_2H_5 \qquad (2)$$

wherein $d$ has an average value of 6. An ethanol-toluene azeotrope was distilled and then sodium bicarbonate (1.9 grams, 0.023 moles) was added. The resulting mixture was heated for two hours and filtered. The filtrate was sparged with nitrogen and the residue was a pale yellow, water-soluble copolymer having the average formula:

(3)

wherein $a$ and $c$ each have an average value of 9.2, $b$ has an average value of 20.7 and $d$ has an average value of 6.

In accordance with the above procedure, the following block copolymers represented by Formula 3 were produced from oxyalkylene polymers represented by Formula 1 and siloxane polymers represented by Formula 2 wherein $a$, $b$, $c$ and $d$ have the indicated values:

| Run | Values of subscripts in Formulae 1, 2 and 3 | | | |
|---|---|---|---|---|
| | $a$ | $b$ | $c$ | $d$ |
| 1 | 13.3 | 30.2 | 13.3 | 6 |
| 2 | 5.9 | 20.7 | 5.9 | 6 |
| 3 | 4.6 | 16.4 | 4.6 | 6 |
| 4 | 9.2 | 20.7 | 9.2 | 6 |
| 5 | 9.2 | 20.7 | 9.2 | 6 |
| 6 | 5.0 | 30.2 | 5.0 | 6 |
| 7 | 79.5 | 30.2 | 79.5 | 6 |
| 8 | 2.2 | 30.2 | 2.2 | 6 |

One mole of the starting siloxane per 3.3 moles of the starting oxyalkylene polymer were reacted in each run.

EXAMPLE 2

Following the procedure set forth in Example 1, 3.3 moles of an oxyalkylene polymer having the formula:

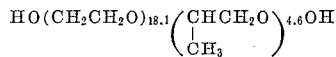

and 1.0 moles of a siloxane represented by Formula 2 wherein $d$ has an average value of 6 were reacted in the presence of 0.1 wt.-percent, 2,6-di-tertiary-p-cresol as an antioxidant to produce a block copolymer having the formula:

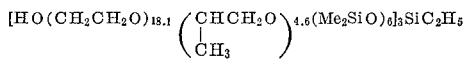

Such antioxidants can be used in producing our block copolymers but they are not essential in the process.

EXAMPLE 3

The procedure used in Example 2 was repeated except that the starting oxyalkylene polymer had the formula:

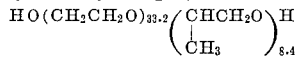

The block copolymer so produced had the formula:

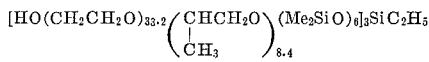

EXAMPLE 4

Following the procedure described in Example 1, 3.3 moles of an oxyalkylene polymer having the average formula:

$$HO(CH_2CH_2O)_{33}H$$

was reacted with one mole of a siloxane polymer represented by Formula 2 wherein $d$ has an average value of 6. The block copolymer so produced had the formula:

$$[HO(CH_2CH_2O)_{33}(Me_2SiO)_6]_3SiC_2H_5$$

EXAMPLE 5

Following the procedure described in Example 1, 3.3 moles of an oxyalkylene polymer having the average formula:

$$HO(CH_2CH_2O)_{76}H$$

was reacted with one mole of a siloxane polymer represented by Formula 2 wherein *d* has an average value of 12.7. The block copolymer so produced had the formula:

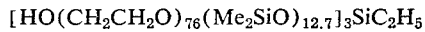
[HO(CH₂CH₂O)₇₆(Me₂SiO)₁₂.₇]₃SiC₂H₅

The block copolymer was reacted with trimethylchlorosilane in the presence of diethyl amine. A precipitate formed and was separated from the liquid produced by filtration. The liquid produced was a block copolymer having the formula:

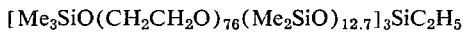
[Me₃SiO(CH₂CH₂O)₇₆(Me₂SiO)₁₂.₇]₃SiC₂H₅

EXAMPLE 6

Following the procedure described in Example 1, 3.3 moles of an oxyalkylene polymer having the formula:

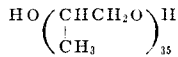
$$HO\left(\begin{array}{c}CHCH_2O\\|\\CH_3\end{array}\right)_{35}H$$

were reacted with one mole of a siloxane represented by Formula 2 wherein *d* is 6. The block copolymer so produced had the formula:

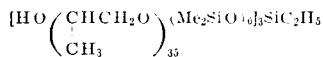
$$[HO\left(\begin{array}{c}CHCH_2O\\|\\CH_3\end{array}\right)_{35}(Me_2SiO)_6]_3SiC_2H_5$$

EXAMPLE 7

Following the procedure described in Example 1, 3.3 moles of an oxyalkylene polymer represented by Formula 1 wherein *a* and *c* each have an average value of 25.5 and *b* has an average value of 38.7 was reacted with one mole of a siloxane having the formula:

[Me₂CHO(Me₂SiO)₆]₃SiMe to produce of block copolymer having the formula:

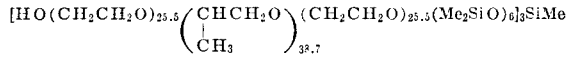
$$[HO(CH_2CH_2O)_{25.5}\left(\begin{array}{c}CHCH_2O\\|\\CH_3\end{array}\right)_{38.7}(CH_2CH_2O)_{25.5}(Me_2SiO)_6]_3SiMe$$

EXAMPLE 8

The procedure used in Example 7 was repeated except that the starting oxyalkylene polymer had the formula:

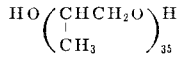
$$HO\left(\begin{array}{c}CHCH_2O\\|\\CH_3\end{array}\right)_{35}H$$

there was so produced a silixane having the formula:

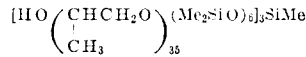
$$[HO\left(\begin{array}{c}CHCH_2O\\|\\CH_3\end{array}\right)_{35}(Me_2SiO)_6]_3SiMe$$

EXAMPLE 9

In accordance with the procedures described above, a block copolymer having the formula:

HO(CH₂CH₂O)₃SiMe₂(OSiMe₂)₆OSiMe₃ was produced by reacting an oxyalkylene polymer having the formula:

HO(CH₂CH₂O)₃H and a siloxane polymer having the formula:

C₂H₅OSiMe₂(OSiMe₂)₆OSiMe₃

EXAMPLE 10

Block copolymer from a phenylethoxypolysiloxane and a polyoxyethylene glycol (av. m. w. 550)

In a one-liter flask connected to a fractionating column there were placed 120 grams (0.22 mole) of polyoxyethylene glycol having an average molecular weight of 550, and 200 cubic centimeters of xylene. The solution was heated at the atmospheric reflux temperature of about 145° C. and any dissolved water present was removed from the head of the column. At this point, 35.5 grams of phenylethoxypolysiloxane containing 25.3 percent ethoxy groups by weight (0.20 mole) and an average of 8 silicon units per molecule and 1.5 grams of potassium dimethyl silanolate catalyst (containing 3.0 percent potassium by weight) were added to the reaction flask. The mixture was heated at the atmospheric reflux temperature (about 135° C.) for 5 hours during which time 13 grams of material distilling at a temperature within the range from 76° C. to 130° C. and consisting mainly of ethyl alcohol and a small amount of xylene were removed from the head of the column. The reaction mixture was stripped of solvent under reduced pressure and there was obtained approximately 140 grams of a gummy, solid product, representing the organo-silicone block copolymer, which was soluble in water and benzene and behaved as an emulsifying agent for benzene-water mixtures.

EXAMPLE 11

Block copolymer from a vinylethoxypolysiloxane and a polyoxyethylene glycol (av. m. w. 550)

In a one-liter flask connected to a fractionating column there were placed 90 grams (0.16 mole) of polyoxyethylene glycol, having an average molecular weight of about 550, and 200 cubic centimeters of xylene. This solution was heated at the atmospheric reflux temperature of about 145° C. and any water present was removed from the head of the column. At this point 50 grams of vinylethoxypolysiloxane (such as that prepared in Example 1) containing 27 percent ethoxy groups by weight (0.3 mole) and an average of 8 silicon units per molecule and 0.5 gram of trifluoroacetic acid catalyst were added. The reaction mixture was then heated at the atmospheric reflux temperature of about 145° C. for 4 hours during which time 4.6 grams of ethyl alcohol were removed at the head of the column. After removing the solvent at a temperature of 150° C. under an absolute pressure of 10 millimeters of mercury, absolute, there was obtained 125 grams of a thick, water-soluble oil, representing the organo-silicone block copolymer. This particular copolymer exhibited properties making it suitable as a glass cloth size.

Examples 12 to 19 illustrate the production of linear block copolymers of this invention.

EXAMPLE 12

Block copolymers from a dialkoxy polydimethylsiloxane (a.m.w. 1036) and a polyoxyethylene glycol (a.m.w. 500)

Three-hundred and eighty-four grams of polyoxyethylene glycol having an average molecular weight of 500 were dissolved in 500 milliliters of xylene and were charged to a 2 liter flask with a fractionating column having a Dean-Stark head. The charge was refluxed at a temperature of 140° C. at atmospheric pressure and about 0.3 milliliter of water was removed. The charge then was cooled and 320 grams of diethoxy-endblocked polydimethylsiloxane having an average molecular weight of 1036 and 4.5 grames of potassium silanolate contaniing 3 percent by weight of potassium were added. The reaction mixture was heated at its reflux temperature of about 120° C. to 140° C. at atmospheric pressure, 29.6 grams of alcoholic material was removed at the column head within the temperature range of 77° C. to 80° C. This alcoholic material was found to have a refractive index at 20° C. with sodium light of 1.3728 and was determined to contain 26.3 grams of ethanol as compared with a 29.4 gram theoretical yield based on a complete reaction. The contents of the flask were stripped of solvent and by-products under a reduced pressure and at a temperature of 200° C. yielding a soft waxy product. An elemental analysis of the product showed that it contained 15.7 percent by weight silicon as compared with the theoretical calculation based on a complete reaction of 16.3 percent silicon by weight.

EXAMPLE 13

Block copolymers from a dialkoxy polydimethylsiloxane (a.m.w. 1036) and a polyoxyethylene glycol (a.m.w. 550)

In a 250 cublic centimeter flask connected to a fractionating column there were placed 15 grams of polyoxyethylene glycol having an average molecular weight of 550, 20 grams of diethoxy-endblocked polydimethylsiloxane having an average molecular weight of 1036, 0.35 gram of potassium dimethylsilanolate catalyst (containing 3 percent by weight of potassium), and 50 cubic centimeters of xylene. The molar ratio of glycol to polysiloxane used herein was equal to about 1.41. The above reactants were heated at the reflux temperature (140° C.) at atmospheric pressure for 3 hours during which time a small amount of material containing ethyl alcohol was removed from the head of the column. About 0.60 gram of n-amyl borate was then added to neutralize the potassium silanolate catalyst and the reaction mixture heated at the reflux temperature for an additional hour. Removal of the toluene solvent by distillation resulted in 29.5 grams of a viscous oily product. On standing the copolymer converted to a soft wax which had good emulsifying properties. An elemental chemical analysis performed on the product of this example is shown below along with a theoretical analysis based on the ratio of reactants:

|  | Weight percent | |
| --- | --- | --- |
|  | Found | Theory |
| Carbon | 43.8 | 42.1 |
| Hydrogen | 9.2 | 8.6 |
| Silicon | 18.7 | 21.3 |
| Oxygen (by difference) | 28.3 | 28.0 |
| Total | 100.0 | 100.0 |

EXAMPLE 14

Block copolymer from a dialkoxy polydimethylsiloxane (a.m.w. 16,500) and a polyoxyethylene glycol (a.m.w. 6000)

In a two-liter flask there were placed 120 grams of polyoxyethylene glycol having an average molecular weight of 6000, 165 grams of diethoxy-endblocked polydimethylsiloxane having an average molecular weight of 16,500, 0.3 gram of trifluoroacetic acid catalyst and 1250 cubic centimeters of xylene. The ratio of moles of polyoxyethylene glycol per mole of polysiloxane used in this example was equal to 2. The mixture was heated at the reflux temperature of about 145° C. under atmospheric pressure for 16 hours while slowly removing a mixture of solvent and a material identified as ethyl alcohol at the head of the column. Upon stripping the xylene solvent under reduced pressure there was obtained 270 grams of a gummy, water-insoluble solid having a reduced specific viscosity of 0.389 and representing the product.

Block copolymers from polyoxy-1,2-propylene glycols and dialkoxy polydihydrocarbylsiloxane Polyoxy-1,2-propylene glycols which can be used in producing our block copolymers are polymeric compositions comprising long chain, polyoxypropylene molecules formed of at least five repeating oxy-1,2-propylene groups, —CH$_3$C$_2$H$_3$O—, with a hydroxyl group attached to each end of each molecule. These glycols may be prepared by the addition reaction of 1,2-propylene oxide to water, 1,2-propylene glycol or the lower polymers of 1,2-propylene glycol and are normally produced as mixtures of polyoxy-1,2-propylene glycols of various molecular weights. The average molecular weights of polyoxy-1,2-propylene glycols useful in forming our block copolymers range from approximately 308 to 3000 higher as for the highly polymerized, long chain polyoxy-1,2-propylene glycols.

Linear copolymers prepared from polyoxy-1,2-propylene glycols and alkoxy-endblocked polysiloxanes in the manner taught by this invention are water-insoluble, viscous oils having lubricating qualities which lend them to uses as lubricants. Such block copolymers can also be dissolved in polyoxy-1,2-propylene glycols, or ethers and diethers thereof, and can be employed as hydraulic fluids or lubricants. These block copolymers can also be mixed with polysiloxanes and employed as lubricants therewith. The following typical examples illustrate methods of preparing several specific polydihydrocarbylsiloxane-polyoxy 1,2-propylene glycol copolymers.

EXAMPLE 15

Block copolymer from a dialkoxy polydimethylsiloxane (a.m.w. 2220) and a polyoxy-1,2-propylene glycol (a.m.w. 2400)

In a one-liter flask connected to a fractionating column there were placed 100 grams of polyoxy-1,2-propylene glycol having an average molecular weight of 2025, 92.5 grams of dimethoxy-endblocked polydimethylsiloxane having an average molecular weight of 2220, 1 gram of potassium dimethylsilanolate catalyst (containing 3 percent by weight of potassium), and 400 cubic centimeters of xylene. The molar ratio of polyoxy-1,2-propylene glycol to polysiloxane used in this example was about 1.2. The mixture was heated at the reflux temperature of about 145° C. under atmospheric pressure for 3 hours during which time a low-boiling material identified as ethyl alcohol was removed from the head or the column along with some solvent. At this point, 0.2 gram of n-amyl borate was added to neutralize the catalyst. Upon removal of the solvent under a reduced pressure there was obtained 135 grams of clear, viscous oily product having a viscosity of 747 cs. at 100° F. and a reduced specific viscosity of 0.21.

Block copolymers from polyoxyethylene-polyoxy-1,2-propylene glycols and dialkoxy polydimethylsiloxanes Polyoxyethylene-polyoxy-1,2-propylene glycols which can be used in producing our block copolymers are polymeric compositions comprising long chain molecules formed of a total of at least five oxyethylene units and oxy-1,2-propylene units with terminal hydroxyl groups. These glycols may be prepared by reacting ethylene oxide and 1,2-propylene oxide sequentially or concurrently with water, an aliphatic dihydroxy alcohol, e.g., ethylene glycol or 1,2-propylene glycol, or lower polymers of ethylene glycol, 1,2-propylene glycol or ethylene-1,2-propylene glycols. The average molecular weights of polyoxyethylene-polyoxy-1,2-propylene glycols which are particularly useful in forming our block copolymers range from 250 to 20,000 and higher.

The linear block copolymers having polydihydrocarbon siloxane blocks and polyoxyethylene-polyoxy-1,2-propylene blocks range in physical properties from viscous oils to gummy solids and from water-insoluble products to water-soluble products. Moreover, such block copolymers can be obtained with specific physical properties, as desired, by the selection of starting materials and molar ratios in which the starting materials are used. For example, block copolymers in which the polyoxyalkylene blocks are derived from water-insoluble polyoxyalkylene glycols are water-insoluble. Also, we have found that, block copolymers which individually have at least 50 percent by weight of their composition which is attributable to the oxyethylene groups are water-soluble.

The following table Table III, illustrates the effect found to be exerted on the water-solubility of polyoxyethylene-polyoxy-1,2-propylene-polysiloxane by the relative weight fractions attributable to oxyethylene units, oxypropylene units and siloxane units in the copolymer molecule. The linear block copolymers represented in this table were produced from diethoxy polydimethylsiloxanes and polyoxyalkylene glycols containing 75 percent by weight of oxyethylene groups and 25 percent by weight of oxy-1,2-propylene groups.

TABLE III

| Average molecular weight of diethoxy polydimethylsiloxane | Average molecular weight of polyoxyalkylene glycol | Approximate weight percent of copolymer attributable to polyoxyethylene units | Water solubility of product |
| --- | --- | --- | --- |
| 2,146 | 13,000 | 64.6 | Soluble. |
| 518 | 400 | 48.0 | Insoluble. |
| 16,000 | 4,560 | 27.3 | Do. |

Alcoholic solutions of the water-insoluble linear block copolymers formed of polyoxyethylene-polyoxy-1,2-propylene glycols and dialkoxy polydihydrocarbylsiloxanes are soluble in water. Such copolymers, in addition to the water-soluble types, are useful as mold release compounds, emulsifying agents and rubber plasticizers. The following specific examples serve to typify copolymeric products of this type and methods for obtaining them.

EXAMPLE 16

Block copolymer from a dialkoxy-polydimethylsiloxane (A.M.W. 518) and a polyoxyethylenepolyoxy-1,2-propylene glycol (A.M.W. 400)

In a 500 cubic centimeter flask there were placed 80.0 grams of polyoxyethylene-polyoxy-1,2-propylene glycol comprising about 75 percent by weight of ethylene oxide and 25 percent by weight of propylene oxide and having an average molecular weight of 400, 51.8 grams of diethoxy-endblocked polydimethylsiloxane having an average molecular weight of 518, 0.2 gram trifluoroacetic acid catalyst and 250 cubic centimeters of toluene. The moles of polyoxyethylene-polyoxy-1,2-propylene glycol per mole of diethoxy-endblocked polydimethylsiloxane equaled 2. The mixture was heated at the reflux temperature of about 120° C. for 4 hours during which time 13 grams of low-boiling material containing 8.9 grams of ethanol were removed at the head of the column. Removal of the toluene under reduced pressure gave 118 grams of a clear, colorless, water-insoluble oil.

EXAMPLE 17

Block copolymer from a dialkoxy-polydimethylsiloxane (A.M.W. 16,000) and polyoxyethylenepolyoxy-1,2-propylene glycol (A.M.W. 4560)

In a one-liter flask there were placed 36.5 grams of polyoxyethylene-polyoxy-1,2-propylene glycol comprising about 75 percent by weight of ethylene oxide and 25 percent by weight of propylene oxide and having an average molecular weight of 4560, 65 grams of diethoxy-endblocked polydimethylsiloxane having an average molecular weight of 16,000, 0.75 gram of trifluoroacetic acid catalyst and 500 cubic centimeters xylene. The molar ratio of polyoxyethylene-polyoxy-1,2-propylene glycol to ethoxy-endblocked polydimethylsiloxane used herein was equal to 2. The mixture was heated at the reflux temperature of about 145° C. for 5 hours during which time some solvent and a low-boiling material identified as ethyl alcohol were removed at the head of the column. After cooling the solution, anhydrous $NH_3$ was bubbled through the solution for two minutes to neutralize the catalyst. The xylene was stripped under reduced pressure and there was obtained 99 grams of a gummy, water-insoluble, solid, alcoholic solutions of which were completely miscible with water.

Block copolymers from polyoxy-1,3-propylene glycols and dialkoxy-polydimethylsiloxane Polyoxy-1,3-propylene glycols vary from slightly water-soluble to water-insoluble, viscous liquids which can be produced in the usual manner by reacting 1,3-propylene oxide with water, or by polymerizing propanediol-1,3 or low molecular weight polymers of propanediol-1,3 in the presence of a hydrogen iodide aqueous solution. These glycols are characterized by long chain molecules comprised of recurring oxy-1,3-propylene units and terminated by two hydroxyl groups, one at each end.

Linear block copolymers prepared from polyoxy-1,3-propylene glycols and alkoxy-endblocked polysiloxanes are water-insoluble, viscous oils having lubricating qualities and closely resemble corresponding copolymers prepared from polyoxy-1,2-propylene glycol and alkoxy-endblocked polysiloxanes. To illustrate the method of preparing these copolymers the following typical example is presented.

EXAMPLE 18

Block copolymer from a dialkoxy-polydimethyl siloxane (A.M.W. 1036) and a polyoxy-1,3-propylene glycol (A.M.W. 760)

In a 50 ml. flask connected to a fractionating column were introduced 50 grams (.06 mole) of polyoxy-1,3-propylene glycol having an average molecular weight of 760 (determined cryoscopically in benzene), 36.4 grams (.01 mole) of diethoxy-endblocked polydimethylsiloxane having an average molecular weight of 1036, 0.18 gram of trifluoroacetic acid catalyst and 150 ml. of toluene as a solvent. The molar ratio of glycol to polysiloxane in this case was 1.87. The resulting solution was heated at the reflux temperature of about 120° C. for 6 hours during which time low-boiling material, boiling between 78° C. and 80° C. was removed at the head of the column. Solid sodium bicarbonate was added to neutralize the catalyst and the mixture was heated to reflux temperature (about 120° C.), cooled to room temperature and filtered. Upon distilling the toluene solvent under reduced pressure there was obtained 81 grams of dark brown, water-insoluble oil having a viscosity of 1445 centistokes at 25° C. and an average molecular weight of about 3000 as determined cryoscopically in benzene.

Block copolymer from polyoxy-1,3-butylene glycols and dialkoxy-polydimethylsiloxanes Polyoxy-1,3-butylene glycols are characterized by polymeric chain molecules comprised of recurring oxy-1,3-butylene units and terminated by two hydroxyl groups, one at each end. These glycols are normally water-insoluble viscous liquids, prepared by reacting 1,3-butylene oxide with water, an alcohol such as n-butyl alcohol; a diol, e.g. butanediol-1,3- or a low molecular weight polyoxy-1,3-butylene glycol.

Linear block copolymers obtained from the reaction of a polyoxy-1,3-butylene glycol and an alkoxy-endblocked polysiloxane are water-insoluble oils having practical applications as lubricants. The following example typifies the preparation of these copolymers.

EXAMPLE 19

Block copolymer from a dialkoxy-polydimethylsiloxane (A.M.W. 518) and a polyoxy-1,3-butylene glycol (A.M.W. 520)

Into a 250 ml. flask connected to a fractionating column there were placed 50 grams of polyoxy-1,3-butylene glycol having an average molecular weight of 520, as determined cryoscopically in cyclohexane, 45.6 grams of diethoxy-end-blocked polydimethylsiloxane having an average molecular weight of 518, 0.2 gram of trifluoroacetic acid and 100 ml. of toluene solvent. The resulting mixture was heated at the reflux temperature of about 120° C. for a period of 4 hours, during which time low-boiling material, distilling between 78°–80° C., and containing ethanol was removed at the head of the column. Solid sodium bicarbonate was added to neutralize the catalyst, and the mixture was heated at the reflux temperature of about 120° C. for a period of 30 minutes, cooled to room temperature and filtered. Upon distilling off the toluene solvent under reduced pressure, there was obtained 82 grams of a homogeneous, water-insoluble oil have a viscosity of 51.7 centistokes and an average molecular weight of 1082, as determined cryoscopically in cyclohexane.

Many other dialkoxy-endblocked polydihydrocarbylsiloxanes can be used in place of those employed in the foregoing examples to produce our linear block copolymers. For example, dialkoxy-endblocked polydihydrocarboylsiloxanes which contain any of the following siloxane units or combinations thereof can be employed:

Diethyl-silixane units, $—Si(C_2H_5)_2O—$, methylethylsiloxane units, $Si(CH_3)(C_2H_5)O—$, dimethylsiloxane units, $—Si(CH_3)_2O—$, diphenylsiloxane units, $—Si(C_6H_5)_2O—$, methylphenylsiloxane units, $—Si(CH_3)(C_6H_5)O—$, ethylphenylsiloxane units, —Si(C$_2$H$_5$)(C$_6$H$_5$)O—, and the like.

As used herein "Me" denotes the methyl group.

As used herein the term "mono-ol" denotes a monohydroxy alcohol (e.g. ethanol); the term "diol" denotes a dihydroxy alcohol (e.g. ethylene glycol); and the term "triol" denotes a trihydroxy alcohol (e.g. glycerol).

What is claimed is:

1. A block copolymer composition comprising at least one siloxane block and at least one oxyalkylene block, wherein (I) each siloxane block (a) is a siloxane polymer composed of difunctional silicon atoms or both difunctional silicon atoms and at least one trifunctional silicon atom (each difunctional silicon atom being linked to two monovalent hydrocarbon groups and two oxygen atoms and each trifunctional silicon atom being linked to a hydrocarbon group and three oxygen atoms) that are joined through silicon-oxygen-silicon bonds and (b) is linked at one end to the oxyalkylene block by a carbon-oxygen-silicon bond and at all other ends to a member selected from the group consisting of (1) another of said oxyalkylene blocks by a carbon-oxygen-silicon bond, (2) a trihydrocarbonsiloxy group and (3) an alkoxy group; and (II) each oxyalkylene block (a) is an oxyalkylene polymer having at least five oxyalkylene units joined together by carbon-oxygen-carbon bonds and (b) is bonded at one end to said siloxane polymer through a carbon-oxygen-silicon bond and at the other end to either (1) another of said siliouxane blocks by a carbon-oxygen-silicon bond or (2) a hydroxyl group, provided at least one oxyalkylene block is bonded at one end to a hydroxyl group.

2. A linear block copolymer as claimed in claim 1 which is free of trifunctional silicon atoms.

3. A composition of matter as claimed in claim 2 composed of a mixture of block copolymers wherein such copolymers each contain at least one siloxane polymer and at least two oxyalkylene polymers in combination have the general formula:

in which, R represents a monovalent hydrocarbon group; R' is an alkyl group when attached to a siloxane polymer and hydrogen when attached to an oxyalkylene polymer; $x$ is an integer of at least 2; $y$ is an integer of at least 5; $n$ is an integer from 2 to 4; $a$ is an integer of at least 1; $b$ is an integer of at least 1, provided at least one group represented by R' is hydrogen attached to an oxyalkylene polymer.

4. A composition of matter as claimed in claim 2 composed of a mixture of block copolymers wherein such copolymers each contain at least one siloxane polymer and at least one oxyalkylene polymer in combination and has the general formula:

R'O[(C$_n$H$_{2n}$O)$_y$]$_c$[(R$_2$SiO)$_x$(C$_n$H$_{2n}$O)$_y$]$_d$[(R$_2$SiO)$_x$]$_e$R' wherein, R represents a monovalent hydrocarbon group; R' is an alkyl group when attached to a siloxane polymer and hydrogen when attached to an oxyalkylene polymer; $n$ is an integer from 2 to 4; $y$ is an integer of at least 5; $x$ is an integer of at least 2; $d$ is an integer of at least one; and $c$ and $e$ are positive integers from zero to one, provided at least one group represented by R' is hydrogen attached to an oxyalkylene polymer.

5. A composition of matter as claimed in claim 2 composed of a mixture of block copolymers wherein such copolymers each contain at least one siloxane polymer and at least one oxyalkylene polymer in combination and have the general formula:

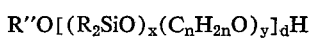

in which, R represents a monovalent hydrocarbon group; R" represents an alkyl group; $n$ is an integer from 2 to 4; $x$ is an integer of at least 2; $y$ is an integer of at least 5; and $d$ is an integer of at least 1.

6. A composition of matter as claimed in claim 2 composed of a mixture of block copolymers wherein such copolymers each contain at least one siloxane polymer and at least one oxyalkylene polymer in combination and have the general formula:

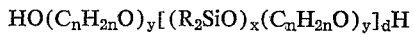

in which, R represents a monovalent hydrocarbon group; $n$ is an integer from 2 to 4; $y$ is an integer of at least 5; $x$ is an integer of at least 2; and $d$ is an integer of at least 1.

7. A composition of matter as claimed in claim 2 composed of a mixture of block copolymers wherein such copolymers each contains at least one siloxane polymer and at least one oxyalkylene polymer in combination and have the general formula:

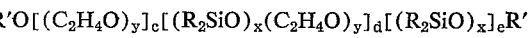

in which, R represents a monovalent hydrocarbon group; R' is an alkyl group when attached to a siloxane polymer and hydrogen when attached to an oxyalkylene polymer; $y$ is an integer of at least 5; $x$ is an integer of at least 2; $d$ is an integer of at least one; and $c$ and $e$ are integers from zero to one, provided at least one group represented by R' is hydrogen attached to an oxyalkylene polymer.

8. A composition of matter as claimed in claim 7 wherein the oxyethylene group content of the block copolymer is more than 33 percent by weight.

9. A composition of matter as claimed in claim 2 composed of a mixture of block copolymers wherein such copolymers each contains at least one siloxane polymer and at least one oxyalkylene polymer in combination and has the general formula:

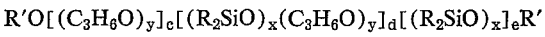

in which, R represents a monovalent hydrocarbon group; R' is an alkyl group when attached to a siloxane polymer and hydrogen when attached to an oxyalkylene polymer; $y$ is an integer of at least 5; $x$ is an integer of at least 2; $d$ is an integer of at least one; and $c$ and $e$ are integers from zero to one, provided at least one group represented by R' is hydrogen attached to an oxyalkylene polymer.

10. A composition of matter as claimed in claim 2 composed of a mixture of block copolymers wherein such copolymers each contains at least one siloxane polymer and at least one oxyalkylene polymer in combination and has the general formula:

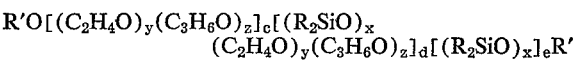

in which, R represents a monovalent hydrocarbon group; R' is an alkyl group when attached to a siloxane polymer and hydrogen when attached to an oxyalkylene polymer; $x$ is an integer of at least 2; $y$ and $z$ are integers whose sum is at least 5; $c$ and $e$ are integers from zero to one; and $d$ is an integer of at least one, provided at least one group represented by R' is hydrogen attached to an oxyalkylene polymer.

11. A composition of matter as claimed in claim 10 wherein the weight fraction of oxyethylene groups of the block copolymer is at least one half the sum of the weight fractions of oxypropylene and siloxane groups of the block copolymer.

12. A composition of matter as claimed in claim 2 composed of a mixture of block copolymers wherein such copolymers each contains at least one siloxane polymer and at least one oxyalkylene polymer in combination and has the general formula:

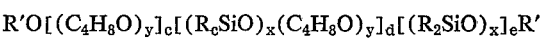

in which, R represents a monovalent hydrocarbon group; R' is an alkyl group when attached to a siloxane polymer and hydrogen when attached to an oxyalkylene polymer; $x$ is an integer of at least 2; $y$ is an integer of at least 5; $c$ and $e$ are integers from zero to one; and $d$ is an integer of at least one, provided at least one group represented by R' is hydrogen attached to an oxyalkylene polymer.

13. A composition of matter as claimed in claim 1 wherein the average molecular weight of the oxyalkylene polymer is within the range from 500 to 6000 and the average molecular weight of the siloxane polymer is within the range from 500 to 75,000.

14. A composition of matter as claimed in claim 1 wherein the siloxane polymer content in the block copolymer is within the range from 5 percent to 95 percent by weight.

15. A block copolymer as claimed in claim 1 which contains at least one trifunctional silicon atom.

16. A block copolymer as claimed in claim 15 wherein the siloxane block is equilibrated and contains at least twelve of said difunctional silicon atoms and at least two of said trifunctional silicon atoms.

17. A block copolymer as claimed in claim 15 having the average formula:

$$(R')(SiO_3)_x(R_2SiO)_y[(C_nH_{2n}O)_zH]_a[R''']_{3x-a}$$

wherein R' is a member selected from the group consisting of the monovalent and the polyvalent hydrocarbon radicals, $x$ is the valence of the radical represented by R', $a$ has a value of at least 1, $y$ has a value of at least 3, $n$ has a value from 2 to 4 inclusive; $z$ has a value of at least 5; R is a monovalent hydrocarbon group; and R''' is a group bonded to the $(R_2SiO)_y$ group selected from the group consisting of the trihydrocarbonsilyl and the alkyl groups.

18. A block copolymer as claimed in claim 15 having the average formula:

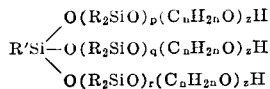

wherein $(p+q+r)$ has a value of at least 3 and R, $n$, R' and $z$ have the meanings defined in claim 17.

19. A block copolymer as claimed in claim 17 having the average formula:

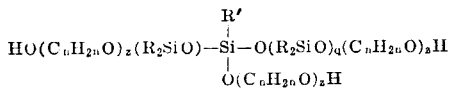

wherein $(p+q)$ has a value of at least 3 and R, $n$, R' and $z$ have the meanings defined in claim 17.

20. A block copolymer as claimed in claim 17 having the average formula:

$$(O_3SiR'SiO_3)(R_2SiO)_y[(C_nH_{2n}O)_zH]_6$$

wherein R, $y$, $n$ and $z$ are as defined in claim 17 and R' is a divalent hydrocarbon group.

21. A block copolymer as claimed in claim 17 having the average formula:

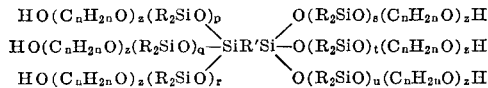

wherein $(p+q+r+s+t+u)$ has a value of at least 3 and R, $n$, R', and $z$ have the meanings defined in claim 17.

22. A block copolymer as claimed in claim 15 having the average formula:

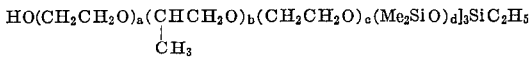

wherein $a$ and $c$ each has an average value from 2 to 80 inclusive, $b$ has an average value from 16 to 31 inclusive and $d$ has an average value from 4 to 8 inclusive.

23. A block copolymer as claimed in claim 15 having the average formula:

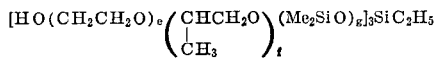

wherein $(p+q+r)$ has a value of at least 3 and R, $n$, R' $f$ has an average value from 4 to 9 inclusive and $g$ has an average value from 4 to 8 inclusive.

24. A block copolymer as claimed in claim 15 having the average formula:

$$[ZO(CH_2CH_2O)_h(Me_2SiO)_i]_3SiC_2H_5$$

wherein $h$ has an average value from 30 to 80 inclusive, $i$ has an average value from 5 to 15 inclusive, and Z is a member selected from the group consisting of the hydrogen atom and the methyl group.

References Cited

UNITED STATES PATENTS

| | | | |
|---|---|---|---|
| 2,834,748 | 5/1958 | Bailey et al. | 260—448.2X |
| 2,917,480 | 12/1959 | Bailey et al. | 260—448.2X |
| 3,480,583 | 11/1969 | Bailey et al. | 260—448.2X |

TOBIAS E. LEVOW, Primary Examiner

P. F. SHAVER, Assistant Examiner

U.S. Cl. X.R.

260—2.5AM, 46.5R, 824R, 825; 252—49.6, 78, 351

UNITED STATES PATENT OFFICE
CERTIFICATE OF CORRECTION

Patent No. 3,600,418            Dated August 17, 1971

Inventor(s) D. L. Bailey & F. M. O'Connor

It is certified that error appears in the above-identified patent and that said Letters Patent are hereby corrected as shown below:

Column 25, line 40, that portion of the formula reading "[$R_2Si$" should read "[($R_2Si$".

Column 28, line 24, "wherein (p+q+r) has a value of at least 3 and R, n, R' " should read "wherein e has an average value from 18 to 24 inclusive".

Signed and sealed this 25th day of April 1972.

(SEAL)
Attest:

EDWARD M. FLETCHER, JR.
Attesting Officer

ROBERT GOTTSCHALK
Commissioner of Patents

PO-1050
(5/69)

UNITED STATES PATENT OFFICE
CERTIFICATE OF CORRECTION

Patent No. 3,600,418                    Dated   August 17, 1971

Inventor(s)  D. L. Bailey & F. M. O'Connor

It is certified that error appears in the above-identified patent and that said Letters Patent are hereby corrected as shown below:

Column 28, line 13, the initial portion of the formula reading "HO" should read "[HO".

Signed and sealed this 25th day of July 1972.

(SEAL)
Attest:

EDWARD M. FLETCHER, JR.
Attesting Officer

ROBERT GOTTSCHALK
Commissioner of Patents